United States Patent Office 3,096,376
Patented July 2, 1963

3,096,376
PROCESS FOR MAKING CYCLOHEXENE HYDROPEROXIDES
Geneviève Clement, 108 Rue de Patay, Paris 13, France, and Jean-Claude Balaceanu, 115 Boulevard Bessieres, Paris 17, France
No Drawing. Filed Mar. 2, 1959, Ser. No. 796,240
Claims priority, application France Mar. 3, 1958
3 Claims. (Cl. 260—610)

THE STEP OF PRODUCING HYDROPEROXIDES OF CYCLOHEXENE AND METHYLCYCLOHEXENE IN A PROCESS FOR MAKING THE CORRESPONDING CONJUGATED DIOLEFINS

This invention relates to the first step in a process for making conjugated diolefins from mono-olefinic starting materials. In particular, this invention relates to a process for producing cyclohexadiene-1,3 and methyl cyclohexadiene-1,3 through the step of forming the hydroperoxides of cyclohexene and methyl cyclohexene, respectively.

It is thus an object of this invention to provide a process for producing the hydroperoxides of mono-olefins, particularly the hydroperoxides of cyclohexene and methyl cyclohexene.

It is another object of this invention to provide a process for converting mono-olefinic compounds to their corresponding conjugated diolefins, particularly cyclohexadiene-1,3 and methyl cyclohexadiene-1,3.

Upon further study of the specification and appended claims, other objects and advantages of the present invention will become apparent.

Conjugated diolefins are well-known as starting materials in the production of plastic materials and synthetic rubber and the like. Thus, they may be polymerized, co-polymerized or condensed with such dienophiles as, for instance, maleic anhydride in order to obtain intermediary products in the synthesis of plastic materials, synthetic resins, or synthetic rubbers. Among the condensations of this type there shall be especially mentioned the Diels-Alder condensations which are described, for instance, in Organic Reactions, vol. IV, published by John Wiley & Sons, New York.

By the present invention, we now provide a process which is selective in yielding a conjugated diolefin from the corresponding mono-olefin, said conjugated diolefins being substantially free of undesirable by-products.

The various steps of the process according to the invention can be illustrated in the following general manner:

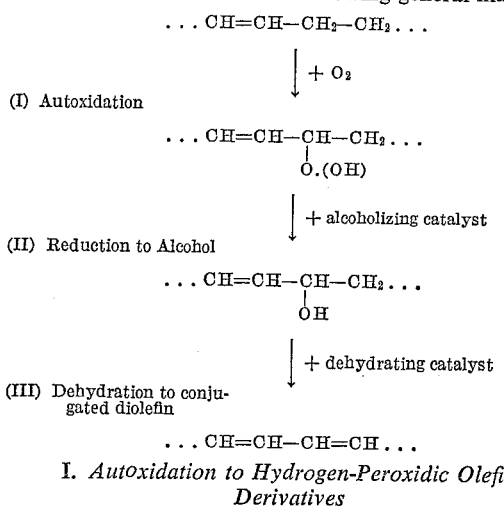

(I) Autoxidation
(II) Reduction to Alcohol
(III) Dehydration to conjugated diolefin I. *Autoxidation to Hydrogen-Peroxidic Olefin Derivatives*

The first stage in the above illustrated process, namely the autoxidation of the starting olefin with the aid of an oxygen-containing gas can be effected in the liquid phase under atmospheric pressure, if the starting olefin is normally liquid at the above-mentioned suitable temperatures, by causing the oxidizing gas to bubble through the liquid olefin. If the starting olefin is in the gaseous phase at the suitable temperature range of preferably 20–150° C., a sufficiently high partial pressure of oxygen or the oxygen-containing gaseous medium is applied so as to maintain the starting olefin in the liquid phase throughout this stage of the process.

Depending upon the types of treated starting olefins, the reaction temperature during this first stage will be chosen from a relatively wide range. Temperatures above 150° C. should, however, be avoided since, at higher temperatures, the hydrogen-peroxide compounds would be decomposed and lead to the formation of undesirable byproducts, disturbing, or completely destroying, the selectivity of the process of our invention. Temperatures below room temperature are preferably avoided in view of the more complicated installations required. In most cases, a reaction temperature between 50 and 150° C. will be preferred.

The partial pressure of oxygen is without influence on the reaction velocity as soon as it exceeds a determined minimum value which depends upon the treated mono-olefin, but is always less than one-half atmosphere. By thus using a partial pressure of oxygen above one-half atmosphere, one can be certain that the full reaction rate will be attained. It is, of course, preferred to avoid waste of oxygen by working at a partial pressure close to, or slightly higher than, the aforesaid minimum value below which the reaction rate would be reduced. However, the partial oxygen pressure may have to be increased considerably, if this is necessary, to maintain the mono-olefin in the liquid phase.

When operating at partial oxygen pressures close to the above-mentioned minimum value and, especially, when treating light molecular weight mono-olefins, the total pressure will be very close to the vapor tension of the treated olefin at the reaction temperature.

However, for a given reaction temperature, that total pressure above the reaction mixture can be reduced if the liquid phase of the reaction mixture is maintained by introducing the starting olefin into the reaction dissolved in a solvent having a higher boiling point than that of the olefin, rather than enforcing the liquid state of the olefin by an increased total pressure of the oxygen containing gaseous phase above the liquid. By this mode of carrying out the process of the invention by operating with a solution of the starting olefin in an inert solvent, it is even possible, in some cases, to have the reaction take place at atmospheric pressure in spite of the low molecular weight of the olefin. The solvents used in this mode of operation must be inert in that they must not be oxidizable and, furthermore, in that they must not react under the operative conditions, or become decomposed, or converted, under these conditions, and in that they must have a boiling point above that of the olefin and also generally above 60° C.

Among the solvents which fulfill these conditions, there shall be mentioned benzene and the chlorine-substituted benzene derivatives as well as a mixture of benzene and nitrobenzene, having a concentration of from 2–10% by weight of the latter component, which serves for avoiding the formation of polymers.

More particularly suitable solvents are benzene, chlorobenzene, dichlorobenzene, but not chloroform and carbon tetrachloride, since they might react with the olefin and become attached to the double bond of the latter. The methylbutenes, having low boiling points, in the order of 20° C. can, for instance, be dissolved in the aforesaid solvents and peroxidized under atmospheric pressure.

If, as will most frequently be the case, the treated starting olefin has a boiling point, which is sufficiently high, so that it remains liquid at the temperature prevailing during the autoxidation step, the latter can be effected under atmospheric pressure, and it will then be sufficient to use enough oxygen to saturate the liquid phase therewith. Starting olefins which can be treated under atmospheric pressure are those having at least 6 carbon atoms per molecule, such as the methylpentenes, cyclohexene, methylcyclohexene, the heptenes, the dodecenes, and others.

In all these cases the reaction temperature must be below the boiling temperature of the mixture.

The autoxidation reaction is facilitated by the presence of an initiating catalyst; this may be advantageously the hydrogen-peroxide produced during the reaction.

If the process is carried out continuously, it will be sufficient to bring the mixture of the reactants into contact with a proportionate amount of the initiating agent, for instance, by maintaining the concentration of the reaction product, i.e. the mono-olefin alpha-hydroperoxide in a constant concentration in the reaction mixture. We have discovered that it is necessary to hold the concentration of the formed olefin hydrogen-peroxide relatively low in order to avoid a decomposition of the hydrogen-peroxidic compounds and the formation of undesirable, difficultly separable byproducts. We, therefore, prefer generally to operate at a constant hydrogen-peroxidic compound concentration in the order of 2 to 20%, and most frequently in the order of 6% by weight. This concentration is currently or intermittently controlled through the process. Adjustment can be effected by adjusting the flow rate of the starting olefin and/or the oxygen-containing gaseous reactant into the reaction zone and correspondingly influencing the reaction velocity in the reactor. The rate of flow at which the starting olefin is introduced into the reactor is adjusted depending upon the capacity of the latter, so as to maintain the aforesaid concentration of hydrogen-peroxidic compounds constant therein, while the reaction mixture containing these compounds at the above-mentioned concentration is withdrawn from the reactor continuously at a rate of flow which is a function of the reactor capacity and of the hourly conversion rate of the olefin in the reactor, and which will be varied inversely depending upon the concentration of the hydrogen-peroxidic compounds in the mixture withdrawn.

Thus, the amount of reaction mixture D to be withdrawn per hour can be determined according to the equation $$D = P \cdot \frac{X}{Y}$$

wherein P represents the weight of the liquid which is maintained constant in the reactor, X represents the amount of hydrogen-peroxidic compounds formed per hour in proportion to the total weight of the reaction mixture, and Y is the stationary concentration of the hydrogen-peroxidic compounds in the reactor.

The conversion rate of the starting olefin to its hydrogen-peroxidic derivatives should preferably be limited to relatively low values in the order of 3–20%, thereby avoiding, as much as possible, all secondary reactions. It is thus possible, in the process according to our invention, to obtain yield rates of the hydrogen-peroxidic compounds which are close to 100% by weight of the consumed starting olefin.

If it is desired to adopt very weak conversion rates, it is always possible to regulate the flow rates of the reactants with regard to the reactor capacity in such a manner as to establish the desired sufficient stationary concentration of hydrogen-peroxidic compounds in the reactor. In any case, the solution of the latter compounds in the treated olefin, which is withdrawn from the reaction mixture can, if necessary, be concentrated at room temperature under reduced pressure; in this case, the evaporated and recondensed olefin can be recycled into the reactor.

EXAMPLE I 200 liters of cyclohexene, to which 5 to 6 liters of cyclohexenyl-(3) hydrogen peroxides have been added as an initiator, are introduced into a reactor having a capacity of 250 liters being provided with stirring means, and, in the bottom portion of the reactor, with an orifice for introducing oxygen and an outlet for withdrawing the reaction mixture. Air is caused to bubble through the liquid mixture in a closed cycle, while the mixture is held at a temperature of about 55° C. and under atmospheric pressure, until a concentration of cyclohexenyl hydrogen peroxides, amounting to about 16% of the reaction liquid, is reached. While continuing the circulation of air through the liquid, the reaction mixture is now withdrawn at a rate of 18 kilograms per hour; the rate of which the olefin is introduced into the reactor is controlled in such a manner, that the volume of reaction liquid in the reactor remains constant. The withdrawn solution, containing alkenyl hydrogen peroxide, is then poured gradually into a normal aqueous solution of sodium hydroxide, maintained at a temperature of 40° C. throughout the duration of the reaction which is in the order of about 80 minutes. After decantation and separation of the resulting aqueous phase from the organic, the latter is washed with water to eliminate traces of sodium hydroxide until the pH value of the organic phase is reduced to 7 and then dried over calcined sodium sulfate. By distillation of the dried solution, cyclohexen-(1)-ol-(3) is obtained at a yield rate of 97%, based on the consumed olefin. The aforesaid cyclohexenol is then dehydrated in the vapor phase by evaporating it and passing the vapors, at a rate of 300 ccs. per minute and at a temperature of 270° C., over a catalyst bed, consisting of 3 kilograms of alumina Pechiney, as used in Example II, activating at 350° C. A mixture is obtained from which the cyclohexadiene-(1,3) is separated by fractionated distillation at a yield rate of 85%, based on the consumed cyclohexen-(1)-ol-(3).

EXAMPLE II 200 liters of methyl-(1)-cyclohexene-(2-, to which 5 to 6 liters of hydrogen peroxides of methyl-(1)-cyclohexenyl hydrogen peroxides have been added as an initiator, are introduced into the same reactor as used in Example I. Air is caused to bubble in a closed cycle through the mixture, which is maintained at a temperature of 55° C. and under atmospheric pressure, until a stationary concentration of the hydrogen peroxides, amounting to about 17% is attained in the reactor. While continuing to bubble air through the reaction mixture, the latter is withdrawn at a rate of 42 kilograms per hour from the reactor, and the flow of olefin into the reactor is controlled in such a manner, that a constant volume of reaction liquid is maintained in the reactor. The withdrawn solution is then brought to a concentration of 60% by evaporating part of the solvent olefins under reduced pressure, and the concentrate is then gradually poured into a 0.5 normal aqueous solution of potassium hydroxide, while the temperature of the same is held at 10° C. throughout the reaction. The reaction is terminated after about 20 minutes and the obtained solution is then treated under the same conditions as described in Example I. Thus, a mixture of methyl-(1)-cyclohexenols is obtained at a yield rate of 99%, based on the converted olefin. This mixture is then dehydrated in the vapor phase by passing it, at a rate of 200 ccs. per minute and a temperature of 280° C., over a catalyst bed, constituted of 6 kilograms of potassium aluminum alum. By distillation of the mixture there is obtained methyl-(1)-cyclohexadiene-(2,6) at a yield rate of 96%, based on the methyl-cyclohexene.

EXAMPLE III

Examples I is repeated, however, instead of air, oxygen is circulated through the liquid in the reactor, while maintaining all other conditions as in Example I. The partial pressure of the cyclohexene at 55° C. is about 0.45 atmosphere. Oxygen consumption per hour is 5.9 kilograms. The solution of the cyclohexenyl hydrogen peroxide is then poured gradually into an aqueous solution of sodium sulfite, containing about 30% of $Na_2SO_3$ and maintained at a temperature of 75° C. throughout duration of the reaction, which is in the order of about 30–90 minutes. After decanting and separating the organic phase, the latter is washed with water in order to remove any traces of the sulfite, and then dried over calcined sodium sulfate. By fractionated distillation of the resulting solution, cyclohexen-(1)-ol-(3) is obtained at a yield rate of 98%, based on the converted olefin. The alcohol is then dehydrated in the vapor phase by passing, at a rate of 300 ccs. per minute, and at a temperature of 270° C. over a catalyst bed, consisting of 3 kilograms of alumina Pechiney, characterized by a grain size of about 2–4 mm., an apparent density of 0.73, a surface of about 250 m.$^2$/g., and being substantially free of $Na_2O$, activated at 350° C. Cyclohexadiene-(1,3), free from unconjugated cyclohexadienes is obtained at a yield rate of 85% of the theoretical value, calculated on the basis of the cyclohexen-(1)-ol-(3) converted during the process.

In most of the above described examples the first stage of treating the olefins is effected under atmospheric pressure and, further, under very simple and economic conditions. It must be borne in mind that this treatment, without use of a solvent, is only possible if the treated olefins have a boiling temperature above 65° C. when a reaction temperature in the order to 50° C. is to be used.

It should be mentioned that, in general, the oxidizing treatment under atmospheric pressure should be carried out at a reaction temperature which is, at least 15 degrees centigrade below the boiling point of the treated olefin. We have empirically found this margin of 15 degrees necessary for ensuring complete selectivity of the process, which margin should be implied through the entire range of reaction temperatures between 50 and 125° C.

Although the above-described examples are all concerned with the treatment of well defined olefins in order to set forth precisely the essential characteristic features of the invention, this process may also be applied without modification of the treatment of mono-olefinic mixtures in order to obtain a mixture of conjugated diolefins substantially free from unconjugated members, whereby it would be easy to separate them from each other by fractionated distillation by the other conventional separating methods.

For certain further uses it would also be possible to employ the mixtures of conjugated diolefins directly, without any need to isolating the different diolefins from the mixture.

It will be understood that this invention is susceptible to further modification and, accordingly, it is desired to comprehend such modifications within this invention as may fall within the scope of the appended claims.

We claim:

1. A continuous process for converting olefins selected from the group consisting of cyclohexene and methylcyclohexene to the corresponding hydroperoxide, which process consists essentially of:
    (1) passing an oxygen-containing gas through a reaction zone containing a mixture of:
        (a) 80–98 parts by weight of said olefin,
        (b) 2–20 parts by weight of the corresponding hydroperoxide, at a temperature between 50–90° C., thereby producing additional hydroperoxide; and
    (2) withdrawing a portion of said mixture from said reaction zone and adding fresh olefin to said reaction zone at a rate of flow sufficient to maintain the hydroperoxide content of said mixture in said reaction zone at not higher than 20%.

2. The process of claim 1 wherein the olefin is cyclohexene.

3. The process of claim 1 wherein the olefin is methylcyclohexene.

References Cited in the file of this patent

UNITED STATES PATENTS

| | | |
|---|---|---|
| 2,558,844 | Gray et al. | July 3, 1951 |
| 2,632,773 | Armstrong et al. | Mar. 24, 1953 |
| 2,678,338 | Linn | May 11, 1954 |
| 2,967,897 | Sharp et al. | Jan. 10, 1961 |

OTHER REFERENCES

Tishchenko: "Chemical Abstracts," vol. 31, 1947, page 2165.

Hoch et al.: "Self-Oxidation of Hydrocarbons and Cumene-Phenol Synthesis," a translation from Angewandte Chemie, vol. 69: 313–321 May 21, 1957. Translation in Div. 38. (Pages 11 and 12 relied on.)

Hock et al.: Berichte deut. chem., vol. 71B (1938), pages 1430–1438 (9 pages; page 1433 only relied on).

Farmer et al.: Jour. Chem. Soc. London (1942), pages 121–139 (19 pages; pages 132, 133 and 135 only relied on).

Moore et al.: Jour. Amer. Chem. Soc., vol. 78 (1956), pages 1173–76 (4 pages).

(Copies of above in Patent Office Sci. Lib.)